United States Patent [19]
Kerko et al.

[11] Patent Number: 5,728,189
[45] Date of Patent: Mar. 17, 1998

[54] METHOD OF ALTERING THE VISIBLE ABSORPTION CHARACTERISTICS OF PERMANENTLY TINTED PHOTOCHROMIC GLASSES

[75] Inventors: David J. Kerko; Brent M. Wedding, both of Corning, N.Y.

[73] Assignee: Corning Incorporated, Corning, N.Y.

[21] Appl. No.: 799,336

[22] Filed: Feb. 13, 1997

Related U.S. Application Data

[62] Division of Ser. No. 585,056, Jan. 9, 1996, Pat. No. 5,639,701.

[60] Provisional application No. 60/005,014, Oct. 10, 1995.

[51] Int. Cl.$^6$ ............ C03C 15/00; C03C 21/00; C03C 23/00; C03B 37/00
[52] U.S. Cl. ............ 65/32.1; 65/30.11; 65/32.3; 65/157
[58] Field of Search ............ 65/30.1, 30.11, 65/32.1, 32.3, 111, 157

[56] References Cited

U.S. PATENT DOCUMENTS

| | | | |
|---|---|---|---|
| 3,208,860 | 9/1965 | Armistead et al. | 65/30.11 |
| 3,892,582 | 7/1975 | Simms | 106/52 |
| 4,118,214 | 10/1978 | Wedding | 65/30 |
| 4,240,836 | 12/1980 | Borrelli et al. | 106/47 |
| 4,284,686 | 8/1981 | Wedding | 428/334 |
| 4,304,584 | 12/1981 | Borrelli et al. | 65/30.11 |
| 4,498,919 | 2/1985 | Mann | 65/32 |
| 4,832,724 | 5/1989 | Borrelli et al. | 65/30.11 |
| 4,908,054 | 3/1990 | Jones et al. | 65/30.11 |
| 4,979,976 | 12/1990 | Havens et al. | 65/30.11 |
| 5,639,701 | 6/1997 | Kerko et al. | 501/13 |

OTHER PUBLICATIONS

J.A. Ruller, D.A. Dutt, G.M. Williams, E.J. Friebele, B.L.Justus, and A.J. Campillo, "Characterization of Quantum-Confined CuCl Microcrystals in a Glassy Matrix", SPIE Proc. 1327 (1990).

*Primary Examiner*—Donald E. Czaja
*Assistant Examiner*—Jacqueline A. Ruller
*Attorney, Agent, or Firm*—Milton M. Peterson

[57] ABSTRACT

A photochromic glass having colorant incorporated in the glass composition to impart a permanent tint, and having its chromaticity point shifted from the blue-green side toward the red side of the white point in the CIE chromaticity coordinate system, and a method of producing such article by heating the article for a sufficient time, and at a sufficient temperature, in a dilute, hydrogen-containing atmosphere to so move the chromaticity point.

6 Claims, 2 Drawing Sheets

METHOD OF ALTERING THE VISIBLE ABSORPTION CHARACTERISTICS OF PERMANENTLY TINTED PHOTOCHROMIC GLASSES

This is a division of application Ser. No. 08/585,056, filed Jan. 9, 1996, now U.S. Pat. No. 5,639,701.

This application claims the benefit of U.S. Provisional Application No. 60/005,014 filed Oct. 10, 1995, entitled PERMANENT TINT PHOTOCHROMIC GLASSES, by David J. Kerko and Brent M. Wedding.

FIELD OF THE INVENTION

Photochromic glasses having a permanent tint imparted by colorants added to the glass composition.

BACKGROUND OF THE INVENTION

Photochromic glasses containing, in their compositions, silver and one or more halogens are well known. The term "halogens" is used here to include only chlorine, bromine and iodine. Such photochromic glasses were first described in U.S. Pat. No. 3,208,860 (Armistead et al.). As there described, the glass compositions, in addition to silver and halogens, consist essentially by weight on the oxide basis of 40–76% $SiO_2$, 4–30% $B_2O_3$, 4–26% $Al_2O_3$ and $R_2O$ selected from 2–8% $Li_2O$, 4–15% $Na_2O$, 6–20% $K_2O$, 8–25% $Rb_2O$ and 10–30% $Cs_2O$, these essentials constituting at least 85% of the glass composition.

A second generation of silver halide-containing, photochromic glasses is described in U.S. Pat. No. 4,190,451 (Hares et al.). The compositions of these glasses are described as consisting essentially of 0–2.5% $Li_2O$, 0–9% $Na_2O$, 0–17% $K_2O$, 0–6% $Cs_2O$, 8–20% total $R_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl and 0.1–0.2% Br, RO-free other than CuO, and the weight ratio of Ag:(Cl+Br) is 0.65–0.95.

Photochromic glasses based on silver halide crystals are produced by dissolving silver and halogens in a suitable base glass melt. Upon a controlled thermal treatment, a silver halide crystal phase is precipitated in the glass. These crystals are subject to photolysis, that is, separation under the influence of short wave radiation such as contained in sunlight, and recombination upon removal of the radiation. This gives rise to photochromism, that is, reversible darkening behavior. The glass is essentially colorless in the faded, or undarkened, state.

It is possible to impart permanent coloration to photochromic glasses by adding conventional glass colorants to the glass batch in minor amounts. Such known colorants include oxides of the transition metal oxides, nickel, cobalt, and chromium. This practice of imparting a permanent tint to photochromic glasses is described in the Hares et al. patent noted above.

More recently, another method of inducing permanent coloration in a photochromic glass has been described. This method involves thermal treatment of the glass in a reducing atmosphere. This involves at least partially reducing the silver to impart the permanent coloration. A flowing stream of hydrogen is commonly prescribed as the reducing atmosphere. The method is described in detail, for example, in U.S. Pat. No. 4,240,836 (Borrelli et al.).

Difficulties have been encountered in using glass colorants, such as the transition metal oxides, to permanently tint otherwise transparent photochromic glasses. In particular, in some glasses the cosmetic effects obtained using such chromophores tend to have an undesirable greenish cast.

The visible absorption characteristics imparted by the chromophores of these oxides are influenced by the glass matrix. Likewise, photochromic performance depends on the glass matrix. Consequently, commonly known techniques for adjusting transmission characteristics are limited.

There are two recognized methods for decolorizing a greenish color such as that induced by iron oxide in glass. One method involves adding an oxide of manganese. The other involves adding the oxide of the rare earth erbium. The addition of manganese is ruled out because, in amounts adequate for the purpose, it has an adverse effect on photochromic performance. The cost, and the uncertain availability, of erbium oxide of adequate purity is such as to make that method undesirable.

It is a purpose of the present invention to provide a viable alternative to these known methods. A further purpose is to provide an effective method of neutralizing the greenish cast encountered in some photochromic glasses permanently tinted by chromophores of transition metal oxides. Another purpose is to provide a means of shifting the chromaticity point of a permanently tinted, photochromic glass to neutralize the greenish cast of the glass color. A particular purpose is to provide photochromic sunglasses having a more pleasing appearance for the wearer.

SUMMARY OF THE INVENTION

One aspect of the invention resides in a photochromic glass having colorant incorporated in the glass composition to impart a permanent tint, and having its chromaticity point shifted from the blue-green side toward the red side of the white point in the CIE chromaticity coordinate system.

Another aspect of the invention resides in a method of producing such photochromic glass article by heating the article for a sufficient time, and at a sufficient temperature, in a dilute, hydrogen-containing atmosphere to move the chromaticity point from the blue-green side toward the red side of the white point in the CIE chromaticity coordinate system.

PRIOR ART

In addition to patents already cited, patent literature deemed relevant is supplied separately.

DESCRIPTION OF THE INVENTION

The present invention relates to development of a permanently colored, or tinted, photochromic glass article. As noted earlier, transition metal oxides, such as NiO, CoO and $Cr_2O_3$, are well known as a means of introducing permanent chromophores, that is, color sources, into glasses including photochromic glasses. Such practice has tended to produce colors having an undesirable greenish shade or cast in certain preferred base glasses. The present invention is based on our finding that such tendency can be avoided.

We have found that the undesirable greenish shade is the result of positioning the chromaticity point to the left of the white point, that is Illuminant C, on a chromaticity diagram representing glass color. Illuminant C is the white point in the 1931 CIE chromaticity coordinate system. It was used in all tristimulus value computations herein. Our invention provides a means of shifting the chromaticity point of a glass toward the opposite, reddish side of the white point.

We have found that this desirable movement of the chromaticity point can be achieved by thermally treating a photochromic, permanently tinted glass in a reducing atmosphere. Development of the desired shift in chromaticity point, however, requires closely controlling the thermal reduction treatment.

The controlled treatment that is characteristic of the present invention is generally applicable to photochromic glasses having (1) an $R_2O$—$Al_2O_3$—$B_2O_3$—$SiO_2$ base glass composition, (2) a silver halide crystal phase developed in the glass to impart photochromic behavior, and (3) up to about 1% by weight of a metal oxide having a chromophore to supply a permanent color or tint to the glass. Suitable base glass compositions are disclosed in the Hares et al. patent noted earlier. The subject matter of this patent is incorporated in its entirety by reference.

In accordance with color theory, opposing primary colors are red/green and yellow/blue. Thus, to make a color less yellow, one adds some blue. In the present case, the objective is to reduce the greenish hue of a glass article, that is, to move toward the red.

Figure 2:
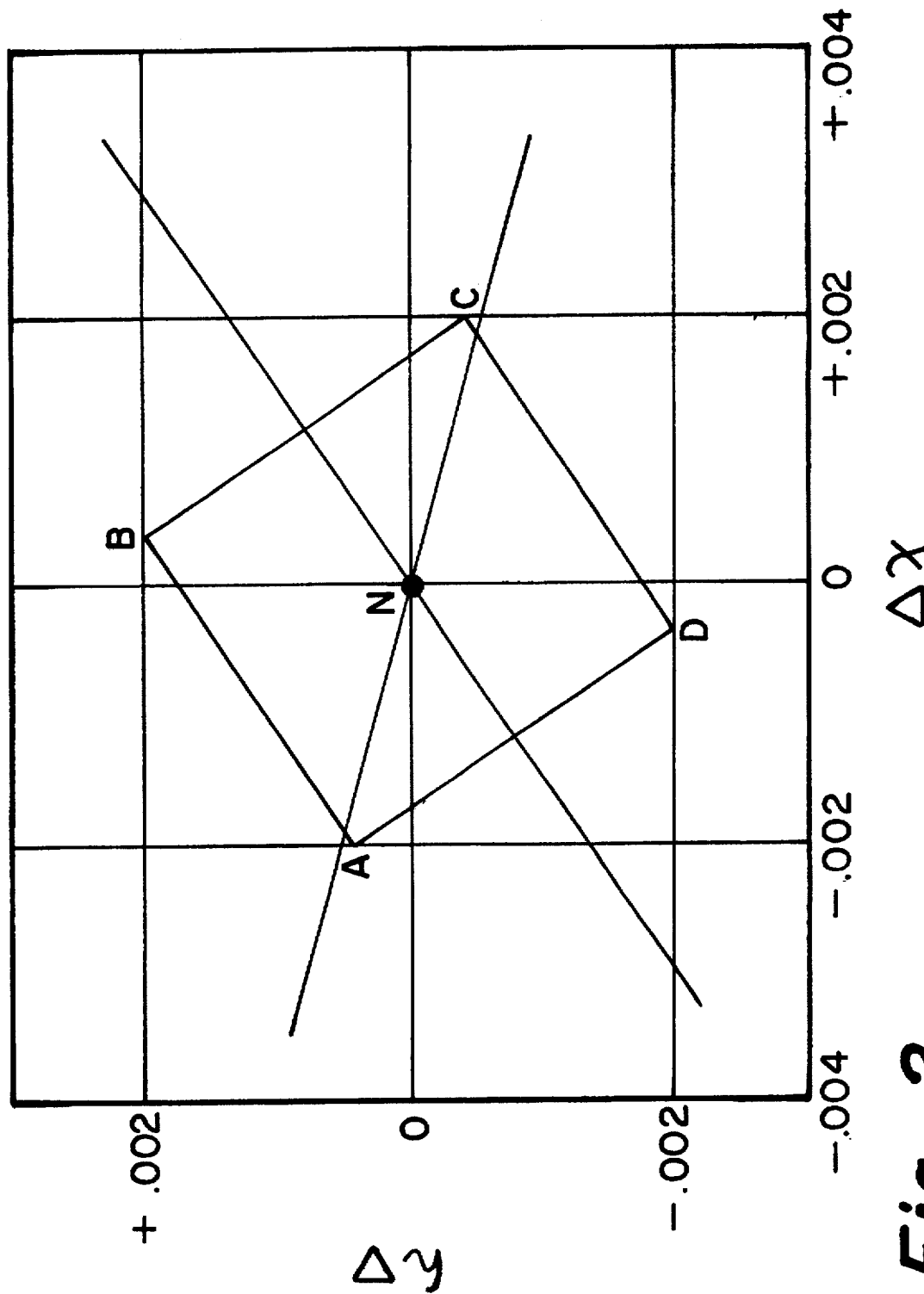
FIG. 2 is a graphical illustration depicting the effect of time and temperature on chromaticity coordinates in accordance with the present invention.

With some photochromic glass compositions, e.g., those shown in FIG. 2 of U.S. Pat. No. 4,240,836, it is not possible to obtain reddish coloration by hydrogen firing without using an additional processing step. U.S. Pat. Nos. 4,537,612 and 4,710,430 (Borrelli et al.) teach a method of accomplishing this by a preliminary ion exchange. The preferred embodiment of the present invention does not require such an additional processing step. However, glasses so treated are included within the scope of the present invention.

Experience gained in developing our invention has shown that careful control of both time and temperature is required to exercise the desired effect on permanent coloration in a photochromic glass. In order to exercise such control, we have found it difficult to employ the customary practice of using a flowing stream of pure hydrogen, or a concentrated forming gas, such as cracked ammonia, for reduction of silver halide crystals.

Accordingly, we use a dilute hydrogen atmosphere containing 5–15% $H_2$ in an inert gas, preferably nitrogen. We prefer a $H_2$—$N_2$ mixture in a ratio of about 1:10 by volume. The thermal reduction process is thus slowed sufficiently to allow any time-temperature fluctuations to average out. This tends to reduce variability of color produced over time in a production line. It is particularly important in an article such as sunglasses where variation in lens color is most undesirable.

In addition to atmosphere control, both time and temperature are controlled. In general, temperature is controlled within the range of 380°–420° C., preferably 390°–410° C., for a time of 15–45 minutes. Firing for about 20 minutes at about 400° C. permits good control.

Our prior patents teach that the hue of coloration produced by hydrogen treatment is strongly temperature dependent. The amount of color imparted depends on treatment time and hydrogen concentration in the treating atmosphere. Practice of the present invention requires control of all three variables. Treatment at temperatures above about 420° C., and/or use of an atmosphere having a high concentration of hydrogen, does not permit proper color control, particularly on a production line.

The invention is further described with reference to three commercial photochromic glasses known under Codes 8114, 8115 and 8135. These glasses, contain amounts of cobalt and nickel oxides within a range of 0.05–0.25% to impart permanent coloration. The glasses, respectively, exhibit light gray, light brown and dark gray colors. Their compositions, in approximate weight percent as calculated from the glass batch, are as follows:

TABLE I

| Component | 8114 | 8115 | 8135 |
|---|---|---|---|
| $SiO_2$ | 56.46 | 56.46 | 56.4 |
| $Al_2O_3$ | 6.19 | 6.19 | 6.2 |
| $B_2O_3$ | 18.15 | 18.15 | 18.1 |
| $Li_2O$ | 1.81 | 1.81 | 1.8 |
| $Na_2O$ | 4.12 | 4.12 | 4.1 |
| $K_2O$ | 5.72 | 5.72 | 5.7 |
| $TiO_2$ | 2.07 | 2.07 | 1.9 |
| $ZrO_2$ | 4.99 | 4.99 | 5.0 |
| Ag | 0.254 | 0.254 | 0.24 |
| CuO | 0.0068 | 0.0068 | 0.0057 |
| Cl | 0.210 | 0.210 | 0.215 |
| Br | 0.169 | 0.169 | 0.16 |
| CoO | 0.022 | 0.0138 | 0.082 |
| NiO | 0.030 | 0.128 | 0.144 |

Lenses produced from each of the glasses tend to have a greenish cast. Thus, Code 8114 lenses have a slightly blue-green cast; Code 8135 lenses have a more pronounced blue-green cast; a Code 8115 lens, a khaki tint. A brief treatment of a polished sample of each glass in a dilute hydrogen gas atmosphere at a temperature near 400° C. removes the greenish appearance present in the untreated glass.

A polished Code 8135 glass plano-power lens having 2 mm-thickness was placed in a tube furnace and heated to 390° C. in a flowing nitrogen atmosphere. After the temperature had stabilized, pure hydrogen was added to the nitrogen stream such that the flow rates were about one part hydrogen to ten parts nitrogen. Twenty minutes later the hydrogen flow was shut off and the mixture was purged from the furnace tube by continuing the nitrogen flow.

After cooling, the visible wavelength spectral transmittance of the lens was measured. From those data, tristimulus values were found by a weighted ordinate method using the 1931 CIE standard observer and Illuminant C. The chromaticity coordinates found from the tristimulus values are given in the table, as are the luminous transmittances (Y). Data for Illuminant C are also given.

| | Before | After | C |
|---|---|---|---|
| x | .3023 | .3164 | .3101 |
| y | .3158 | .3160 | .3161 |
| Y | 47.95 | 39.60 | 100.0 |

Even though the colors before and after treatment are both very near neutral, one observes substantial changes in visible appearance. This is a consequence of shifting the chromaticity point from the blue-green side to the red side of the white point.

Figure 1:
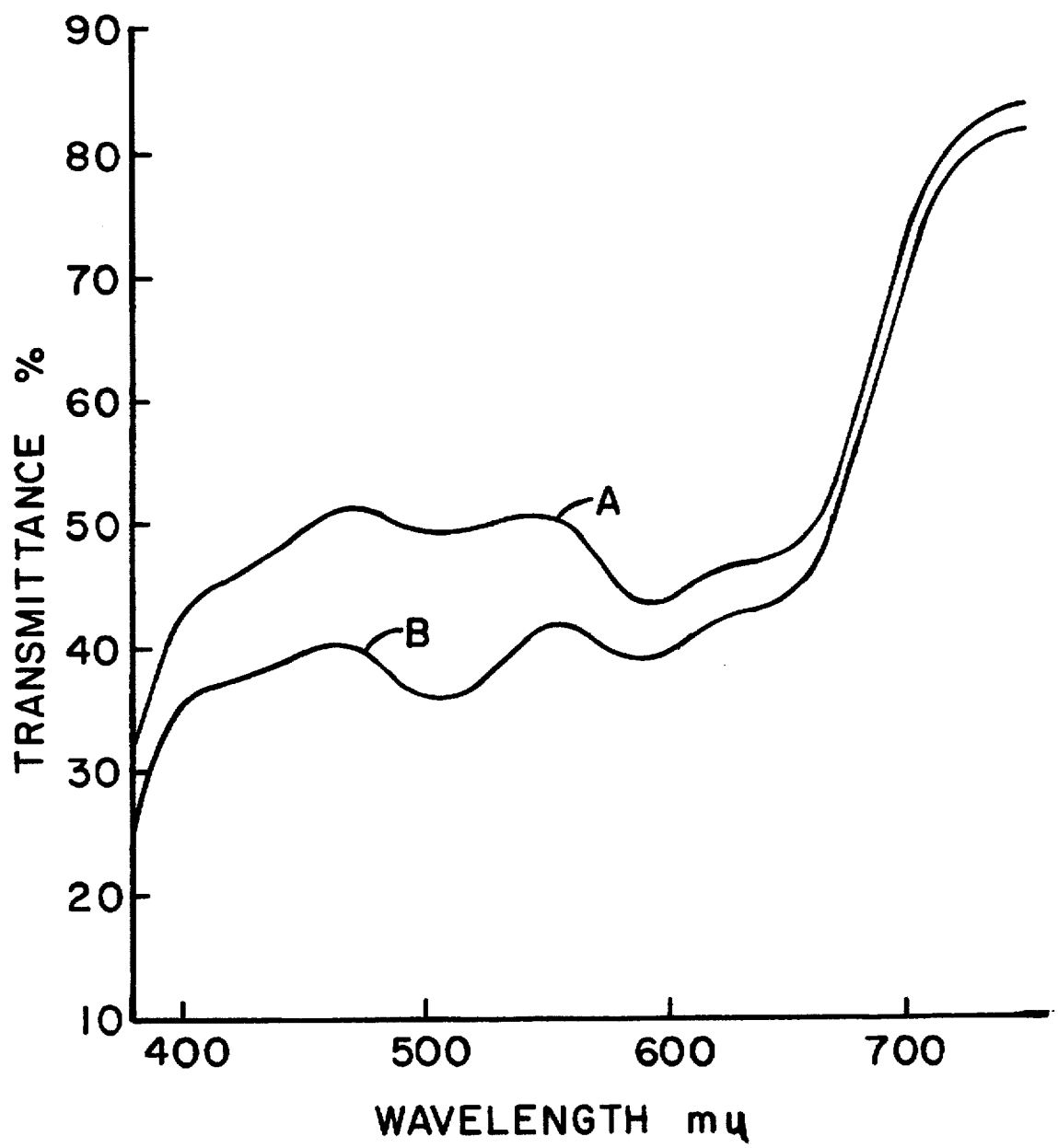
FIG. 1 in the accompanying drawing is a graphical depiction of two comparative glass transmittance curves.

FIG. 1 is a graphical depiction of spectral transmittance. Wavelengths are plotted in millimicrons (mµ) on the horizontal axis. Transmittance is plotted in percent on the vertical axis. FIG. 1 displays plots of the spectral transmittance of the Code 8135 lens before and after tinting. Curve A represents the transmittance of the untreated glass, that is, prior to the thermal reduction. Curve B represents the transmittance of the glass sample after treatment as described above. It may be noted that the relatively greater spectral transmittance in the wavelength interval 460–550 nm imparts the slight blue-green coloration to the lens prior to treatment as shown by Curve A. This effect has been reduced by the treatment in accordance with the invention as shown by Curve B.

FIG. 2 is a graphical representation depicting the effect of time and temperature variations on chromaticity coordinates. $\Delta x$ represents changes in a selected nominal x coordinate, and is plotted on the horizontal axis. $\Delta y$ represents changes in a selected nominal y coordinate, and is plotted on the vertical axis. FIG. 2 shows a chromaticity target box ABCD tentatively selected as an aid in developing the invention.

Box ABCD is centered on a pair of x and y coordinates selected as a target value and designated by N. It represents permissible variations from that target value. $\Delta$ values are plotted to more vividly depict changes that may occur. The vectors, shown as arrows, illustrate the positive and negative coordinate variations from a fixed point, such as N, that are effected by variations in time and temperature. The vectors indicate that, given a targeted time and temperature, it is necessary to maintain the time at ±10% of that value, and to maintain the temperature at ±3° C. of the temperature value. These are the maximum variations permissible to stay within the targeted chromaticity target box in this example.

We claim:

1. A method of altering the visible absorption characteristics imparted by metal oxide glass colorants in a permanently tinted photochromic glass article, the article comprising an $R_2O$—$B_2O_3$—$Al_2O_3$—$SiO_2$ base glass, silver halide crystals precipitated throughout the glass, and one or more metal oxide glass colorants selected from the group consisting of NiO, CoO, and $Cr_2O_3$ in the base glass composition, which comprises thermally treating the article in a dilute hydrogen-containing atmosphere for a sufficient time and at a sufficient temperature to move the chromaticity point of the glass from the blue-green side toward the red side of the white point in the CIE chromaticity coordinate system.

2. A method in accordance with claim 1 which comprises thermally treating the article in an atmosphere containing an inert gas and 5–15% hydrogen.

3. A method in accordance with claim 1 which comprises thermally treating the article in a temperature range of 380°–420° C.

4. A method in accordance with claim 1 which comprises thermally treating the article for a time of about 15–45 minutes.

5. A method in accordance with claim 1 which comprises thermally treating the glass article in a reducing atmosphere composed of about one part $H_2$ to 10 parts $N_2$ for about 20±2 minutes at a temperature of about 400°±3° C.

6. A method of neutralizing the greenish cast in a photochromic glass containing silver halide crystals and permanently tinted with a glass colorant metal oxide selected from the group consisting of NiO, CoO, and $Cr_2O_3$ which comprises thermally treating the article in a dilute hydrogen-containing atmosphere for a sufficient time and at a sufficient temperature to move the chromaticity point of the glass from the blue-green side toward the red side of the white point in the CIE chromaticity coordinate system.

* * * * *